United States Patent [19]
Lloyd et al.

[11] Patent Number: 5,473,903
[45] Date of Patent: * Dec. 12, 1995

[54] METHOD AND APPARATUS FOR PRODUCING CARBON DIOXIDE PELLETS

[75] Inventors: Daniel L. Lloyd, Mason; Frederick C. Young, Maineville, both of Ohio

[73] Assignee: Cold Jet, Inc., Loveland, Ohio

[ * ] Notice: The portion of the term of this patent subsequent to Apr. 12, 2011, has been disclaimed.

[21] Appl. No.: 226,733

[22] Filed: Apr. 12, 1994

Related U.S. Application Data

[63] Continuation of Ser. No. 910,839, Jul. 8, 1992, Pat. No. 5,301,509.

[51] Int. Cl.$^6$ ................................................... B29C 43/00
[52] U.S. Cl. ................................................ 62/35; 62/384
[58] Field of Search ........................................ 62/35, 384

[56] References Cited

U.S. PATENT DOCUMENTS

| | | | |
|---|---|---|---|
| 3,835,657 | 9/1974 | Scudder | 62/35 |
| 4,770,684 | 9/1988 | Tsukada et al. | 62/35 |
| 4,780,119 | 10/1988 | Brooke | 62/35 |
| 4,947,592 | 8/1990 | Lloyd | 51/436 |
| 5,018,667 | 5/1991 | Lloyd | 239/132.5 |
| 5,050,805 | 9/1991 | Lloyd | 239/424 |
| 5,188,151 | 2/1993 | Young et al. | 137/874 |

*Primary Examiner*—Ronald C. Capossela
*Attorney, Agent, or Firm*—Frost & Jacobs

[57] ABSTRACT

There is provided a method and apparatus for practicing carbon dioxide particle blasting utilizing dense carbon dioxide pellets which have been formed by converting the solid carbon dioxide into liquid, flowing that liquid within a plurality of die openings, and transforming the liquid back into the solid phase while still within the die opening. This method includes the formation of a carbon dioxide cake within a snow barrel, urging the carbon dioxide cake against an upstream surface of a die plate having a plurality of die openings with such pressure such that the carbon dioxide becomes liquified within or adjacent the entrance of the die opening due to the pressure, responding as a super viscous liquid, and flowing within a portion of the respective die openings as a liquid. Along the length of the die openings, the liquid changes phase back to the solid state, while the die openings maintain compression (accompanying the back pressure) on the $CO_2$ to create pellets having a high density. The pellets are thereafter transported to an application nozzle and directed against a workpiece.

16 Claims, 12 Drawing Sheets

METHOD AND APPARATUS FOR PRODUCING CARBON DIOXIDE PELLETS

This is a continuation of application Ser. No. 07/910,839 filed Jul. 8, 1992, now U.S. Pat. No. 5,301,509.

TECHNICAL FIELD

The present invention relates generally to particle blasting apparatuses and methods, and is particularly directed to apparatuses and methods for manufacturing sublimable pellets for use in cryogenic particle blasting. The invention will be specifically disclosed in connection with apparatuses and methods for producing carbon dioxide pellets and for using the carbon dioxide pellets in a carbon dioxide blasting system.

BACKGROUND OF THE INVENTION

Cryogenic particle blasting is now relatively well known. The process generally utilizes sublimable particles, such as carbon dioxide pellets, which are propelled against a work piece for a variety of reasons, such as, for example, to remove contaminates or coatings from the surface of the work piece. Although carbon dioxide is referred to herein, it will be understood that any cryogenic sublimable material may be used.

The effectiveness and efficiency of the cryogenic blasting process depends at least in part upon the type of contaminate or coating being removed and the nature of the surface from which it is being removed. Problems which typically arise in utilizing $CO_2$ particle blasting to remove contaminates or coatings from a surface include attaining complete coating or contaminate removal from the surface, attaining an acceptable removal rate, and preventing damage to the underlying surface or substrate. This is particularly a problem when carbon dioxide blasting is used to remove surface coatings from aircrafts wherein the substrate thickness is as low as 0.020 inches. In such an application, the carbon dioxide blasting process must be sufficient to remove the surface coating without damaging the thin substrate by creating stress buildup therein or work hardening the surface.

Several prior art methods and apparatuses are known for $CO_2$ particle blasting. Some of these are set forth in U.S. Pat. Nos. 4,947,592, 5,018,667 and 5,050,805, and co-pending U.S. patent application 07/781,326 filed on Oct. 22, 1991, now U.S. Pat. No. 5,188,151 all of which are incorporated herein by reference. The process typically includes the formation of carbon dioxide pellets by producing carbon dioxide snow which is formed into carbon dioxide pellets by forcing the snow through circular die openings. As disclosed by U.S. Pat. Nos. 4,947,592 and 5,018,667, one method of forcing the $CO_2$ snow through die openings is by use of a piston. Other apparatuses for forming $CO_2$ pellets include rotary pelletizers.

The diameters of the prior art pellets, as dictated by the diameter of the die opening, are 0.120 inches and larger. After producing the pellets, they are then transported by a transport gas to an application nozzle designed to accelerate the transport gas flow and the entrained pellets to a high velocity. This exiting flow is directed at the work piece.

While the prior art pellets produced an acceptable removal of coatings or contaminates on a substrate, the pellets' size and speed created deleterious effects on the substrate itself. A cryogenic flow of pellets sufficient to produce complete coating or contamination removal at an acceptable rate can damage the substrate by deforming it and creating stresses.

Thus, there is a need in the art for a method and apparatus which provides sufficient coating or contaminate removal at an acceptable removal rate, which does not damage the substrate.

SUMMARY OF THE INVENTION

Accordingly, it is a primary object of the present invention to provide a method and apparatus for effectively and efficiently removing a coating or contaminate from a substrate without damaging the substrate.

It is another object of the present invention to provide a method and apparatus for producing pellets of a sublimable material which can be used for the effective and efficient removal of coatings and contaminates from a substrate in a particle blasting process without damaging the substrate.

It is yet another object of the present invention to provide a method and apparatus for producing pellets made of a sublimable cryogenic material which are smaller than those previously known to be used in the prior art.

Yet another object of the present invention is to provide a method and apparatus for producing cryogenic particles having a high weight density, which in turn results in the particles possessing a greater apparent surface hardness.

Additional objects, advantages and other novel features of the invention will be set forth in part in the description that follows and in part will become apparent to those skilled in the art upon examination of the following or may be learned with the practice of the invention. The objects and advantages of the invention may be realized and obtained by means of the instrumentalities and combinations particularly pointed out in the appended claims.

To achieve the foregoing and other objects, and in accordance with the purposes of the present invention as described herein, there is provided a method and apparatus comprising the practice of carbon dioxide particle blasting utilizing carbon dioxide pellets having a diameter of less than 0.120 inches, and increasing the flux density of pellets striking the workpiece.

In accordance with another aspect of the present invention, there is provided a method and apparatus for practicing carbon dioxide particle blasting utilizing dense carbon dioxide pellets which have been formed by converting the solid carbon dioxide into liquid, flowing that liquid within a plurality of die openings, and transforming the liquid back into the solid phase while still within the die opening. This method includes the formation of a carbon dioxide cake within a snow barrel, urging the carbon dioxide cake against an upstream surface of a die plate having a plurality of die openings with such pressure such that the carbon dioxide becomes liquified within or adjacent the entrance of the die openings due to the pressure, responding as a super viscous liquid, and flowing within a portion of the respective die openings as a liquid. Along the length of the die openings, the liquid changes phase back to the solid state, while the die openings maintain compression on the carbon dioxide to create pellets having a high density. The pellets are thereafter transported to an application nozzle and directed against a workpiece.

Still other objects of the present invention will become apparent to those skilled in this art from the following description wherein there is shown and described a preferred embodiment of this invention, simply by way of illustration, of one of the best modes contemplated for carrying out the invention. As will be realized, the invention is capable of other different embodiments, and its several details are capable of modification in various, obvious aspects all without departing from the invention. Accordingly, the drawings and descriptions will be regarded as illustrative in nature and not as restrictive.

BRIEF DESCRIPTION OF THE DRAWINGS

The accompanying drawings incorporated in and forming a part of the specification illustrate several aspects of the present invention, and together with the description serve to explain the principles of the invention. In the drawings:

FIG. 4A is an end view of the die backing block for use with the die plate illustrated in FIG. 3a.

FIG. 4B is an exploded, perspective view of the die backing block of FIG. 4A.

Reference will now be made in detail to the present preferred embodiment of the invention, an example of which is illustrated in the accompanying drawings.

DETAILED DESCRIPTION OF THE PREFERRED EMBODIMENT

According to one of the methods of the present invention, the particle blast cleaning process, and in particular, the carbon dioxide particle blast cleaning process, is carried out utilizing generally cylindrical $CO_2$ pellets having a diameter of less than 0.120 inches. In this new method, the $CO_2$ pellets are formed in a pelletizer having die openings which are configured to produce pellets having a diameter less than 0.120. The lengths of the pellets produced are substantially uniform, typically having a length to diameter ratio of 2.5:1, but ranging as low as 1:1.

According to the various embodiments of this method of the present invention, pellets having diameters of 0.080 inches, 0.060 inches and 0.040 inches may be utilized in practicing this method of the invention. Contrary to the prior art, which has focused on maximizing the size of the pellets while maintaining the flowability of the pellets through the process, the embodiments of this method of the present invention are directed to maximizing the flux density of the pellets striking the surface. The flux density is the number of pellet impacts per unit time per unit area. At the same mass flow rate of $CO_2$, the number of individual pellets striking the work surface is greater with the smaller pellets, and this increased flux density is more efficient at removing coatings or contaminates than the prior art processes using the larger pellets and corresponding lower flux densities. The increased effectiveness of the higher flux density attained by using these smaller pellets allows the operator to reduce the pressure of the transport gas, thereby lowering the individual pellet velocity resulting in less kinetic energy being imparted to the surface, thereby reducing or preventing damage to the work piece.

By utilizing this new method incorporating the smaller pellets, greater effectiveness and higher rates of coating or contaminate removal may be obtained. It is believed that the smaller pellets are more evenly distributed throughout the discharge flow of the exit nozzle of the blasting system, and can be accelerated to a higher velocity at the exit of the nozzle by a given flow of transport gas than the larger prior art pellets could be.

Another method of the present invention is directed toward the process by which the $CO_2$ pellets are formed. The prior art processes for forming $CO_2$ pellets utilize mechanical shear to extrude solid carbon dioxide through die openings. This shear extrusion process limits the density of the pellets which can be created. The shear is accomplished by forcing the $CO_2$ snow through the die opening while in the solid state. Although some liquification of the $CO_2$ has been noted to occur adjacent the interior walls of the die openings, such liquification has been at low liquid pressures and de minimus, with the primary process being mechanical shearing.

However, according to this method of the present invention, the carbon dioxide pellets are formed by plasticizing the solid $CO_2$ allowing it to flow through the die openings. Plasticizing the solid $CO_2$ creates a super viscous liquid $CO_2$ (such as occurs under high pressure such as 5,000 psi) which flows as a fluid into the die opening, rather than being extruded as a sheared solid through the die opening. Thus, substantially all of the $CO_2$ immediately downstream of the entrance of the die opening is a liquid, and more particularly, acts as a super viscous liquid.

In this process, as the $CO_2$ travels the length of the die opening, it changes to the solid phase within the die opening once the pressure of the liquid drops low enough along the length of the die opening to allow the liquid to change phase to the solid state. The pressure on the $CO_2$ at the die opening exit is approximately atmospheric, so the pressure drop across the die plate (i.e. along the length of the die opening) depends upon the pressure at the entrance to the die opening.

The creation of $CO_2$ pellets by liquifying the $CO_2$ solid cake at the entrance of each die opening under high pressure and causing the liquid to flow through the die opening and transform back into solid within the length of the die opening can be used to make various sizes of $CO_2$ pellets, including pellets having diameters greater than 0.120. It is particularly applicable to pellets having diameters less than 0.120. As will be described below in connection with an apparatus for practicing this method, the super viscous liquid $CO_2$ flow within the die openings is created by subjecting the solid $CO_2$ cake located upstream of and adjacent the die plate within the pelletizer to pressures of approximately 5,000 psi. The practice of this method results from coordination and control of the pelletizer piston speed and the configuration of the die openings. The shape, size, length and number of die openings must enable the super viscous liquid to be formed at the die opening entrance, and to change phase to solid along the length of the die opening. For example, if the piston "overdrives" the die plate (i.e., e.g. at high piston speeds) the liquid to solid transformation front will move closer to the exit of the die opening, producing $CO_2$ snow rather than dense pellets. "Underdriving" the piston will increase the length of time required to make the pellets, but will still produce the dense pellets through plasticizing.

In practicing this method of the present invention, it is desirable to promote laminar flow of the super viscous liquid within the die opening. To do so, the entrance of the die opening is configured to reduce turbulence and preferably to result in a Reynolds number under 2000.

By practicing this method of the present invention, it is believed to be possible to produce "super" dense pellets, approaching and exceeding the theoretical maximum density of carbon dioxide of 97.6 $lb/ft^3$ at 1 Atmosphere. As an example of the super density attainable by utilizing this super viscous liquid fluid flow process, the inventors have been able to create long "spaghetti" like continuous strings of solid carbon dioxide which can be tied in a knot. It is possible the super density of such $CO_2$ pellets may be limited in time as the solid $CO_2$ has no crystalline structure which can retain the internal stresses. Thus, it is believed, that over time the density of many of the super dense pellets may decrease. In the $CO_2$ particle blast process, the pellets flow through the system so fast that the pellets may reach the application nozzle before such reduction of density.

Because the solid $CO_2$ formed according to this method tends to retain its "spaghetti" like shape downstream of the die plate, a cutter is provided adjacent the downstream side of the die backing block to produce pellets of substantially uniform lengths. The specific cutter will be described below.

Figure 1:
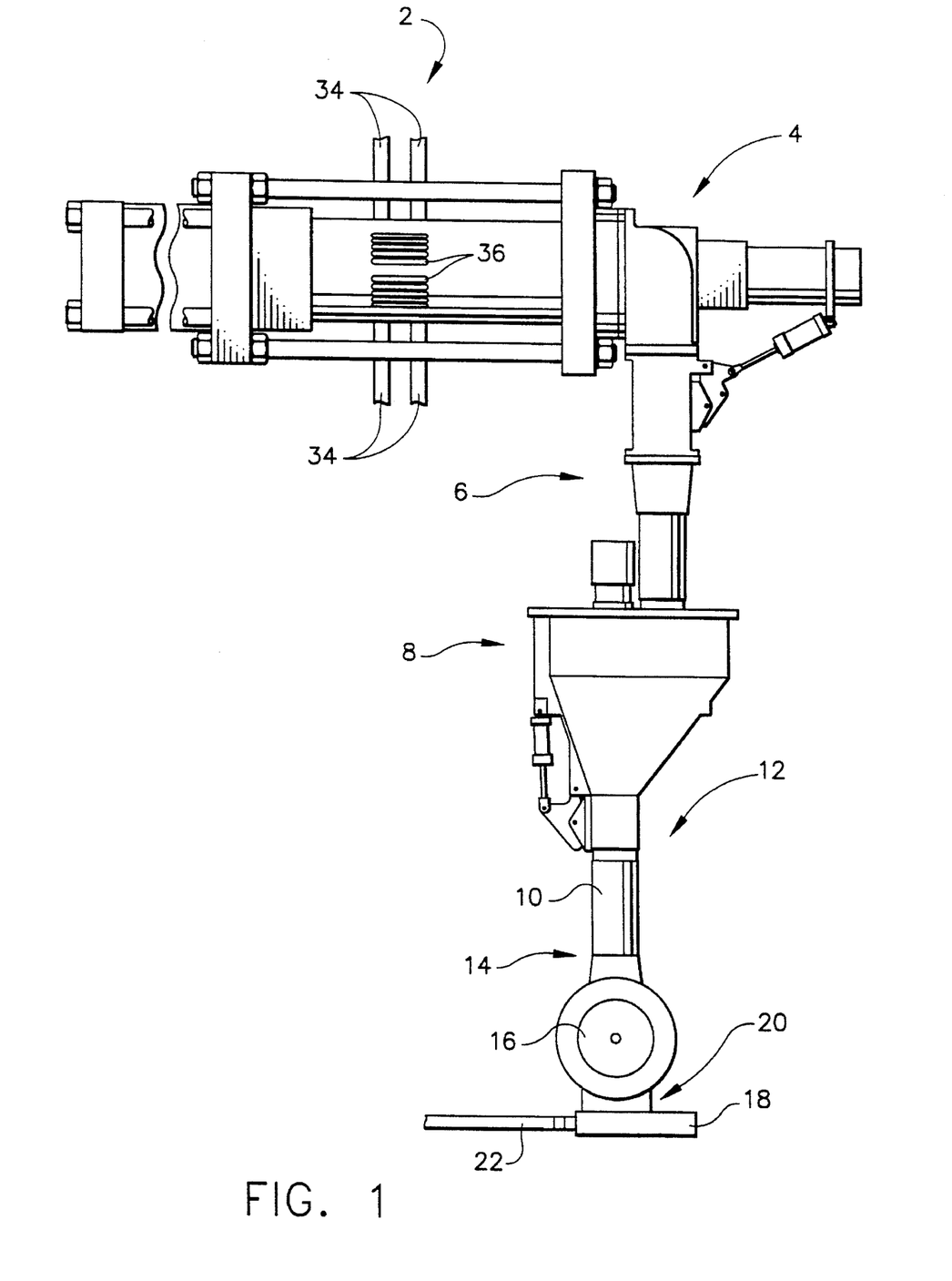
FIG. 1 is a fragmentary, side elevational view showing the pelletizer, hopper, feeder and air block, constructed according to the present invention.

Referring now to the figures, there is shown an embodiment of an apparatus suitable for practicing the various methods of the present invention. FIG. 1 is a side fragmentary elevational view showing pelletizer assembly 2, with elbow 4 connected thereto, and disposed to receive pellets formed by pellet assembly 2. Transition assembly 6 is interposed between elbow 4 and hopper assembly 8, configured to direct $CO_2$ pellets into hopper assembly 8 from elbow 4. Tube 10 connects exit 12 of hopper assembly 8 with receiving station 14 of feeder assembly 16. Air block 18 is located adjacent discharge station 20, whereat $CO_2$ pellets are introduced into the transport gas flow. Discharge hose 22 is connected to outlet 24 of air block 18, and receives the transport gas with the entrained $CO_2$ pellets, and carries them to the application nozzle (not shown).

Figure 2:
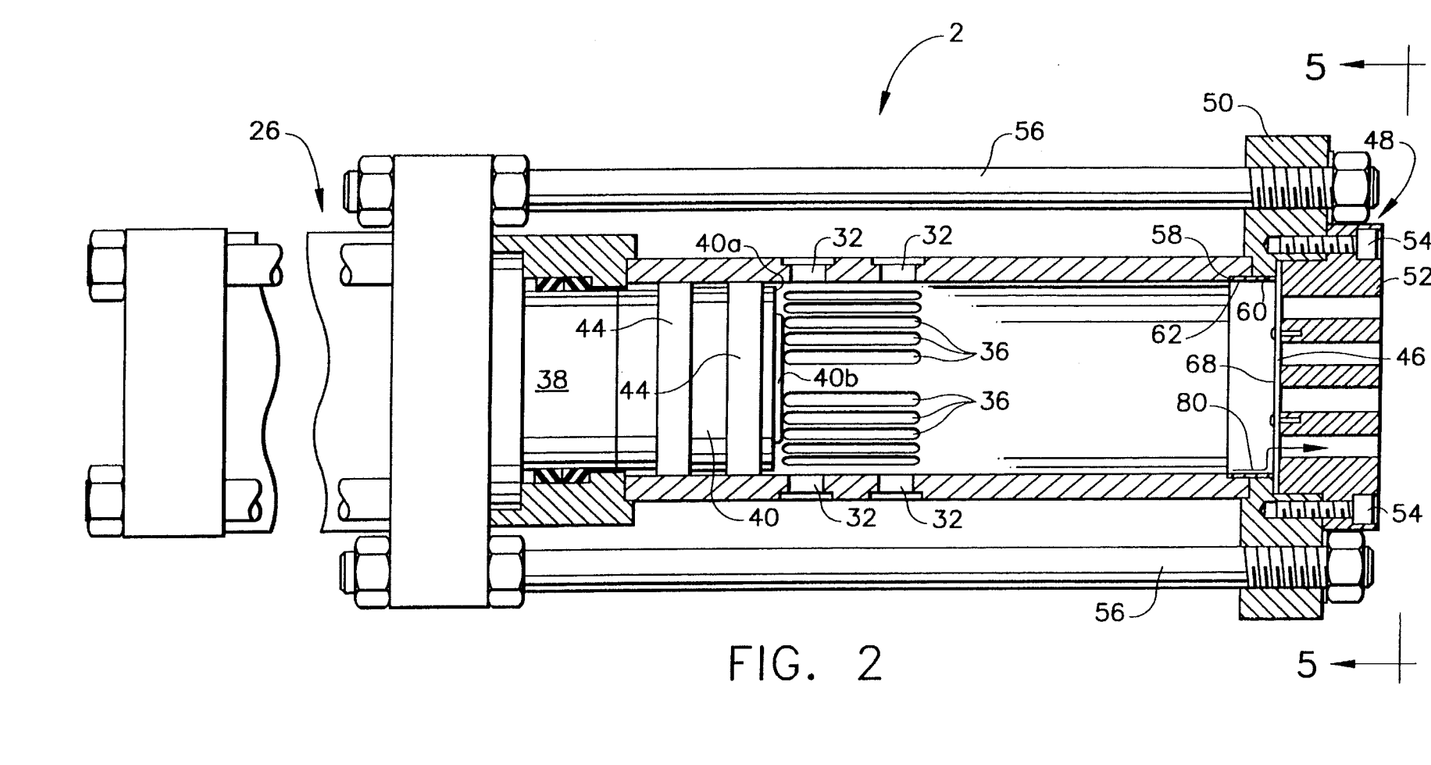
FIG. 2 is an enlarged, fragmentary cross-sectional view of a pelletizer constructed according to the present invention.

Referring also to FIG. 2, there is shown an enlarged, fragmentary, cross-sectional view of pelletizer assembly 2 and hydraulic system 26. Pelletizer assembly 2 includes snow barrel 28 which defines internal snow chamber 30 into which $CO_2$ snow is injected by a phase change injection nozzle (not shown) similar in function to that described in U.S. Pat. No. 5,018,667, and located in ports 32. Liquid $CO_2$ is delivered to the injection nozzles through $CO_2$ line 34. Although four ports and $CO_2$ lines are illustrated, more or less injectors may be used. As the liquid $CO_2$ is transformed to $CO_2$ snow by the phase change injection nozzles, the $CO_2$ is deposited in chamber 30. During this phase change process, some of the $CO_2$ liquid will be introduced into chamber 30 as gas. Depending upon the efficiency of the phase change injection nozzles, as much as 50% of the $CO_2$ liquid may be flashed to gas in this process. Barrel 28 includes a plurality of openings 36 which allow the $CO_2$ gas to be vented from chamber 30. A collector (not shown) is located adjacent openings 36 to collect the $CO_2$ gas, directing it through a heat exchanger (not shown) disposed to cool the incoming the $CO_2$ liquid in $CO_2$ lines 34. The collector also includes very fine screens (not shown) which are located adjacent openings 36, thereby preventing the $CO_2$ snow from flowing out through openings 36, while still allowing the $CO_2$ vapor to escape therethrough. At this point in the process, the internal pressure of chamber 30 is approximately atmospheric, so the $CO_2$ snow is not forced out through the screens.

Connected to snow barrel 28 is hydraulic system 26 which includes ram 38 disposed to be extended into chamber 30 and retracted therefrom hydraulically. Connected to ram 38 is piston 40 which is disposed in internal chamber 30. Piston 40 has about 0.100 inches of clearance on each side between it and internal wall 42 of barrel 28. Wear rings 44 are made of plastic and disposed in annular grooves formed about piston 40. Wear rings 44 engage internal wall 42 about their outside diameter, thereby sealing chamber 30 and substantially preventing $CO_2$ snow from leaking past both wear rings 44 as piston 40 is advanced toward die plate 46. Wear rings 44 also function to maintain the alignment and spacing of piston 40 relative to internal wall 42. In this embodiment, piston face 40a includes raised portion 40b, which was found to produce more even compression of the $CO_2$ cake across the area of die plate 46.

Typically, the cycle time for pelletizer is 24 seconds of producing $CO_2$ snow followed by 4–5 seconds of compression by piston 40, and 7–8 seconds of retraction.

Die plate 46 is disposed at exit end 48 of pelletizer assembly 2, and is retained in a stepped bore formed in end cap 50 by die backing block 52 which is connected by fasteners 54 to end cap 50. As illustrated by FIG. 2, elongated fastening rods 56 retain end cap 50 to pelletizer assembly 2.

The inside diameter of internal wall 42 of barrel 28 is illustrated as including step 58 leading to a larger internal diameter which is aligned with and the same size as internal diameter 60 of end cap 50. Disposed within this recessed area is annular ring 62 which functions as a thermal barrier. Annular ring 62 is made of plastic. This thermal barrier helps insulate the $CO_2$ cake from the walls of snow barrel 28, since the $CO_2$ cake remains at this location during "dead" times, thereby maintaining the integrity of the $CO_2$ cake. The pelletizer efficiency is based on the pressure drop across the die plate and the temperature of the $CO_2$ at the inlet to the die plate relative to the temperature at the outlet. Typically, after running for 10 to 15 minutes, the temperature of die plate 46 is stabilized at its minimum temperature, thereby providing efficiency.

Figure 3:
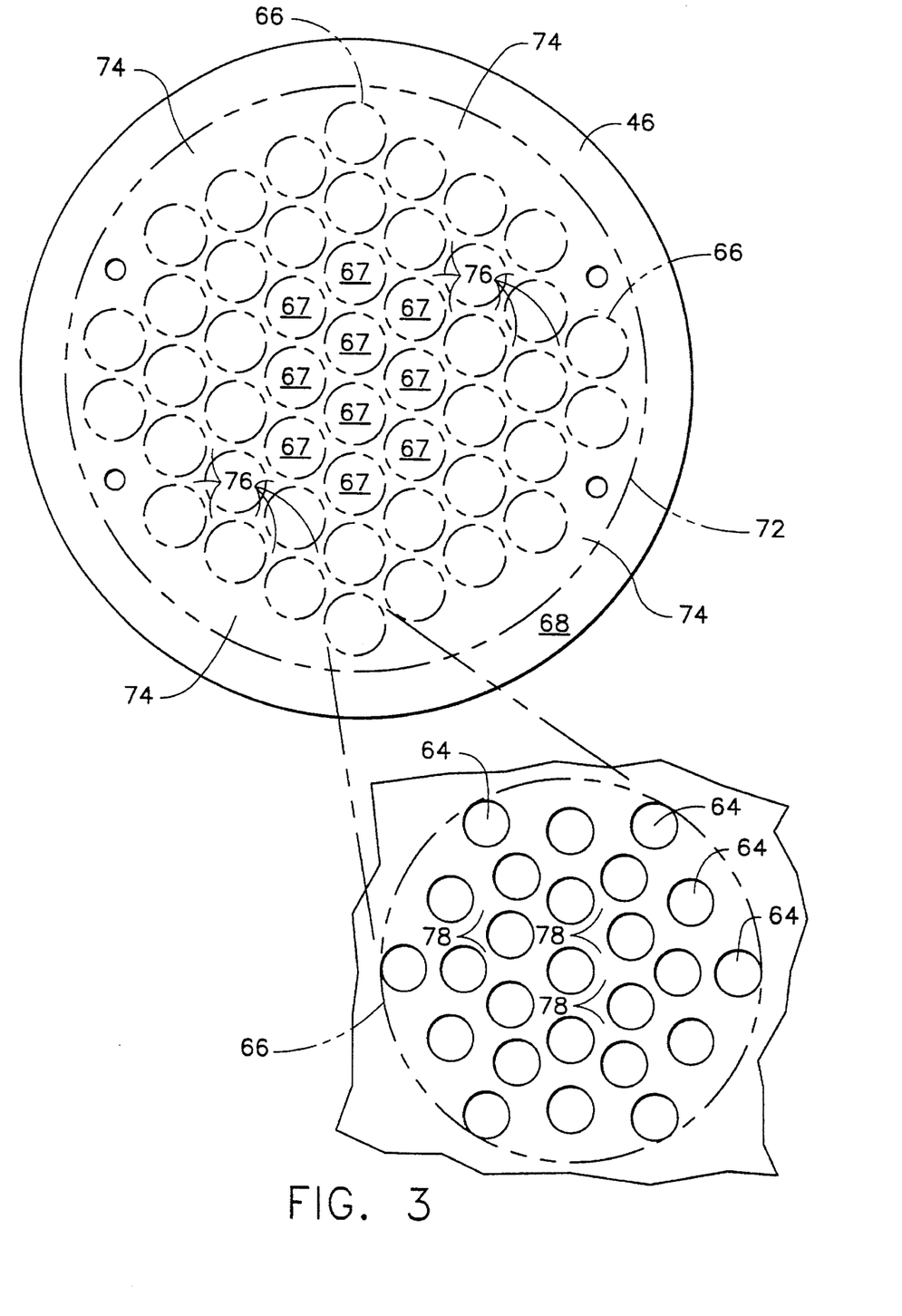
FIG. 3 is an end view of one embodiment of the die plate according to the present invention, including an enlarged, fragmentary view thereof.
Figure 4:
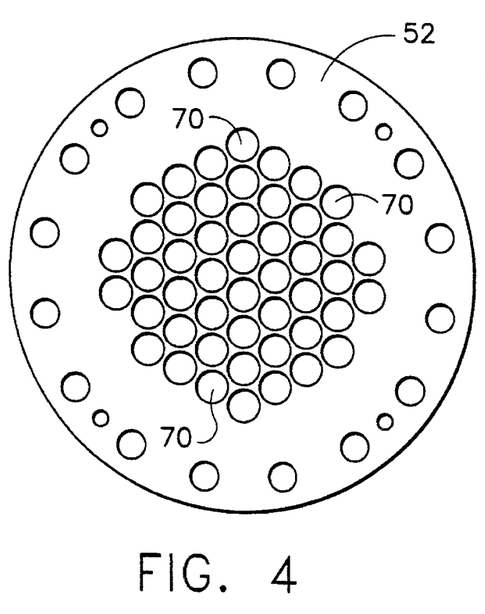
FIG. 4 is an end view of the die backing block for use with the die plate illustrated in FIG. 3.
Figure 5:
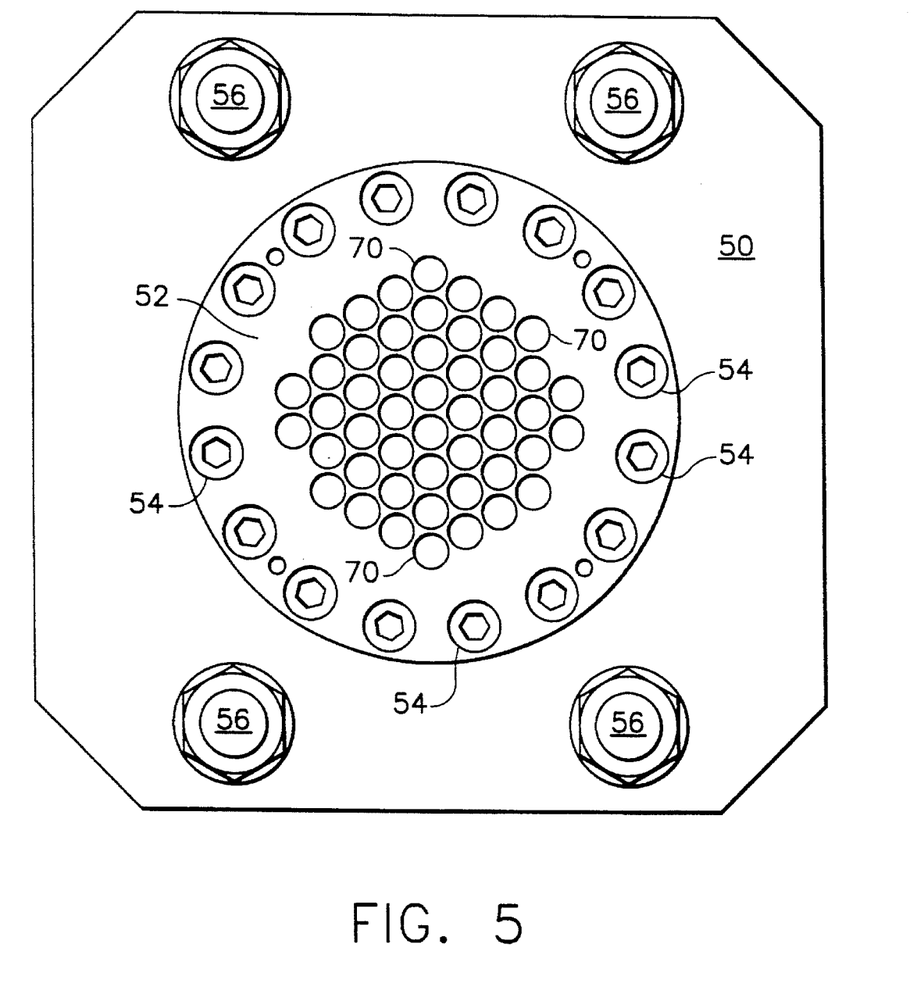
FIG. 5 is an end view of the pelletizer showing the die backing block of FIG. 4, taken along line 5—5 of FIG. 2.

Referring now to FIG. 3, there is shown an end view of one embodiment of die plate 46, as it would appear removed from pelletizer assembly 2. Die plate 46 includes a plurality of die openings 64 arranged in a plurality of clusters 66. The typical arrangement of die openings 64 is shown in the enlargement of a cluster 66 in FIG. 3. However, for clusters 67, the die opening arrangement is rotated 90° from that shown in the enlargement of FIG. 3. FIG. 4 illustrates the embodiment of die backing block 52 corresponding to die plate 56 of FIG. 3. As shown in FIG. 2, backing block 52 has a substantial thickness relative to die plate 46, and provides the support to maintain the position and dimensional shape of die plate 46 against the pressure of the $CO_2$ cake (not shown) formed in chamber 30 adjacent die plate 46 by extending piston 40 to its full extended position, which is approximately 25 mm from die plate 46. As previously mentioned, according to the teachings of the present invention, the pressure at the interface between the $CO_2$ cake (not shown) and the upstream surface 68 of die plate 46, and more particularly at the entrance of each die opening, during extension of piston 40 typically reaches pressures of 4500 psi and up to 5,000 psi, which is limited by the currently available hydraulic rams and pistons. Higher pressures, when achievable, may be used to practice the invention. Backing block 52 includes a plurality of exit openings 70 which, when located adjacent die plate 46 in pelletizer assembly 2, are aligned with clusters 66. FIG. 5 illustrates the external end view of exit end 48 of pelletizer assembly 2 with backing plate 42 mounted to end cap 50 by fasteners 54.

Figure 3A:
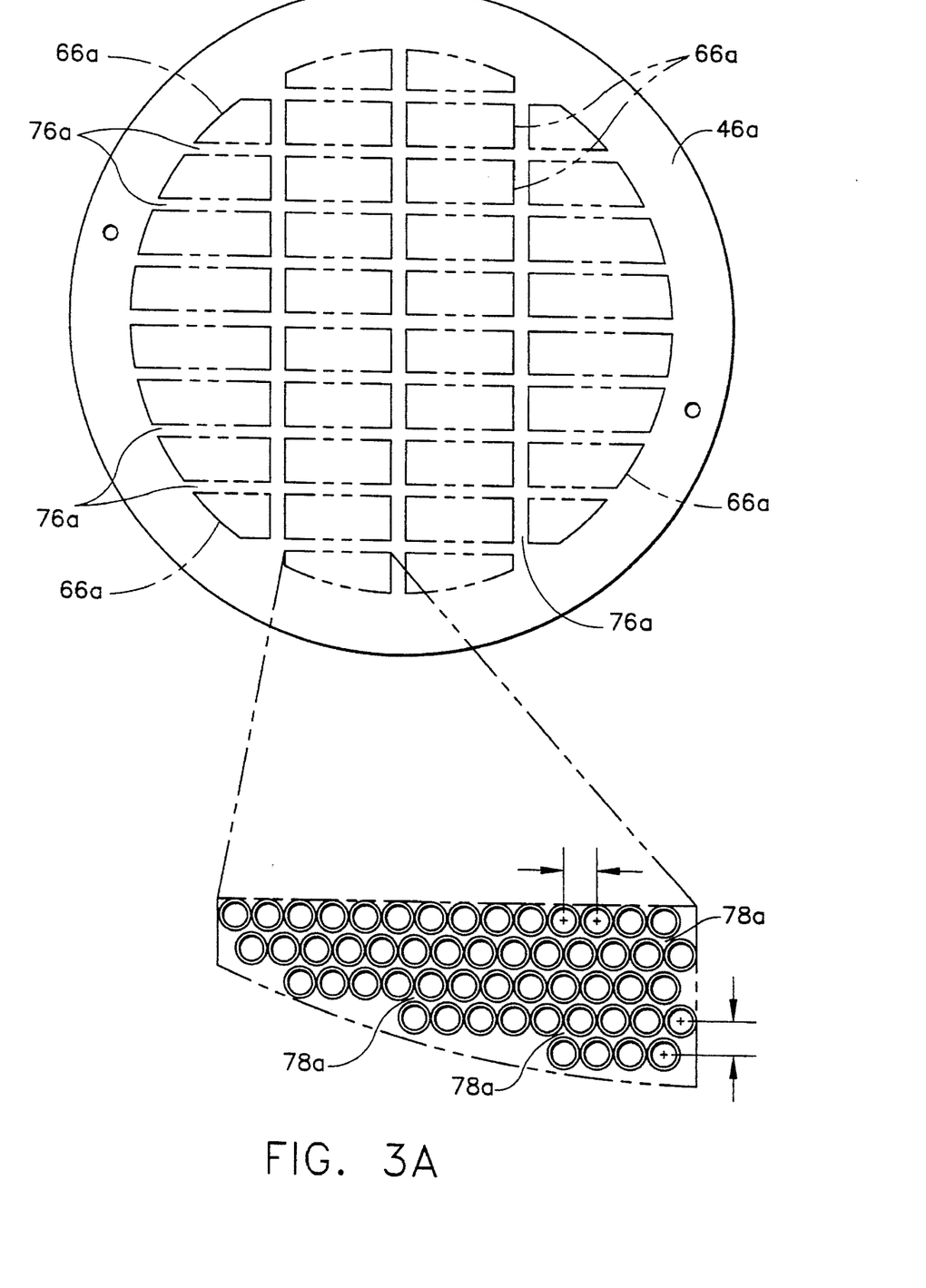
FIG. 3A is an end view of one embodiment of the die plate according to the present invention, including an enlarged, fragmentary view thereof.

Referring again to FIG. 3, dashed line 72 indicates the inside diameter of annular ring 62 which closely conforms to the inside diameter of chamber 30, and concomitantly the outside diameter of the $CO_2$ cake formed by compression of the $CO_2$ snow. It is noted that in this embodiment of die plate 46, there are regions 74 of die plate 46 created by the arrangement of clusters 66 which fall within the outside diameter of the $CO_2$ cake. Regions 74, as do lands 76 between clusters 66 and lands 78 between die openings 64, "dead head" against the $CO_2$ cake. Lands 76 and 78, in conjunction with the shape of die openings 64 beneficially contribute to creating the pressure necessary to plasticize the $CO_2$ cake at the entrance to the die openings so as to produce the super viscous liquid within the entrance of the die opening 64 which flows from the entrance substantially all as a liquid, in accordance with the present invention. However, regions 74 are of such a size and location that the dead heading of the $CO_2$ cake thereagainst can result in deleterious effects on the process of forming the $CO_2$ pellets through die openings 64 located adjacent regions 74. This configuration generally causes the $CO_2$ about the outside diameter of the $CO_2$ cake to flow radially inward and into die opening 64 as schematically illustrated by flow arrow 80 of FIG. 2. This represents an unbalanced die plate, producing irregular flow at the edges. This flow characteristic presented some problems for die plate 46 when the diameter of die opening 64 was approximately 0.080 inches, although it did not prevent the practice of the present invention with die plate 46. However, when smaller die openings were used, such as 0.060 inches and 0.040 inches, this dead heading caused substantial deleterious effects on the process of forming to the $CO_2$ pellets. Therefore, another embodiment of the die plate, identified as die plate 46a in FIG. 3A can used. Die openings 64a are arranged in groups 66a in a tightly packed pattern as shown in the enlargement of die opening 64a in FIG. 3a. This pattern represents a substantial reduction in the lands 78a between die openings 64a as well as lands 76a between groups 66a. This arrangement of die openings 64a minimizes dead head region 74a about the outside of the pattern of die openings 64a, thereby minimizing or substantially eliminating the deleterious effects of the outer peripheral regions of the $CO_2$ cake. By way of example, for die openings 64a having a nominal internal diameter of 0.060 inches, the center to center horizontal spacing (as shown in FIG. 3A) was nominally 0.080 inches, and the vertical distance between the centers of die opening 64a was nominally 0.080 inches. For die openings 64a having a nominal diameter of 0.040 inches, these center spacings were nominally 0.060 inches.

Figures 4A, 4B:
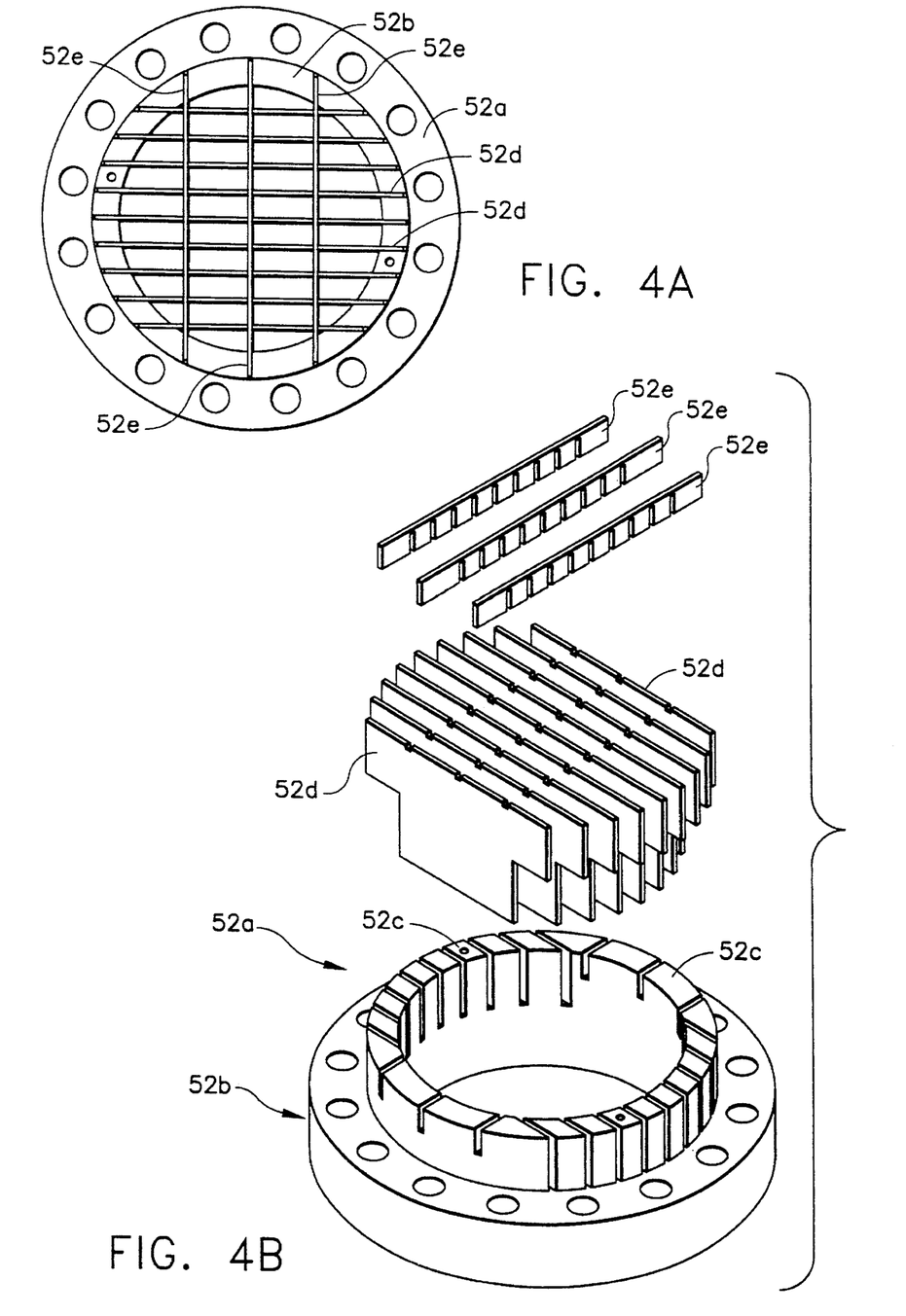

FIGS. 4A and 4B illustrate die backing plate 52a which corresponds to die plate 56a. As shown most clearly in the perspective view of FIG. 4B, die backing plate 52a includes annular support 52b which has a plurality of slots 52c for receiving and retaining a plurality of respective support plates 52d and 52e which align with lands 76a of die plate 46a.

Figure 3B:
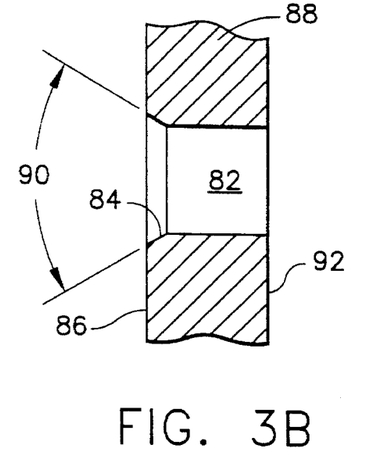
FIGS. 3B, 3C, and 3D are enlarged, fragmentary cross-sectional views of die openings constructed in accordance with the teachings of the present invention.
Figure 3C:
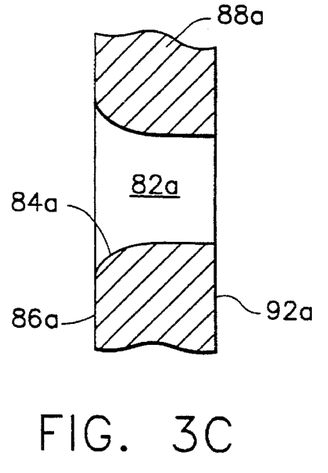

Referring now to FIGS. 3B and 3C, there are shown cross sections of various profiles of die openings 82 and 82a which may be used as die openings 64 or 64a. In forming the die openings, there is a balance between the cost of manufacture of the die plate and the efficient design of the die opening. In terms of the manufacturing process, the most cost effective manner to form such openings through the die plate would be to stamp the openings. However, the diameter of the openings, the number of the openings, as well as the smallness of the lands between the openings make stamping a non-viable method, particularly for smaller openings, such as 0.060 inches and 0.040 inches. Drilling the holes is an equally unattractive manufacturing method, both because of the number of holes and expense associated therewith. Other methods of manufacturing include electrical discharge machining (EDM) and laser. Both of these methods are expensive, although the laser machining of the small (0.060 inches and 0.040 inches) die openings is less expensive than EDM. The die plate is made of stainless steel, both because of its corrosion resistance and because of the nature of its machinability. The internal bores of the die openings formed in the die plate have a roughness, which is probably in the range of 64–125 micro inches. This roughness contributes to maintaining compression in the die opening and maintaining back pressure. Smooth die open bores do not work as well.

Keeping in mind that the configuration of the die opening and the entrance is selected to promote non-turbulent, laminar flow having a Reynolds number lower than 2,000, in FIG. 3B, there is shown die opening 82 having counterbore 84 formed adjacent upstream surface 86 of die plate 88. The exact configuration of die opening 82 and counterbore 84 has varied in practice in dependence upon the nominal inside diameter of die opening 82, and the method of manufacture. For example, with respect to a nominal diameter of 0.080 inches, wherein the die openings are drilled through the die plate having a thickness of 0.090 inches, counter bore 84 had a depth of 0.015 inches and an included angle 90 of 60°. Die opening 82 was tapered from the end of counter bore 84 to within approximately 0.030 inches of downstream surface 92 with a #5/0 taper pin reamer. As another example, die openings having a nominal diameter of 0.060 inches and 0.040 inches are machined by laser beam. The laser beam process, in which die opening 82 is cut from upstream surface 86 toward downstream surface 92, produces an extremely precise opening at downstream surface 92. As a result of the process, die opening 82 tapers inwardly toward downstream surface 92 resulting in a slight decrease in diameter along the length of die opening 82 in the downstream direction. In this process, counter bore 84 is formed to "clean up" the entrance to die opening 82 which was formed by the removal of molten metal created by the laser beam process. For die openings having a nominal diameter of 0.060 inches, through a die plate having a thickness of 0.090 inches, a counter bore having included angle of 82° was machined to a depth of 0.010 inches, and had a diameter at that depth of 0.064 inches. For die openings having a nominal diameter of 0.040 inches, formed through a die plate having a thickness of 0.105 inches, the counter bore had a depth of 0.010 inches and an included angle of 60°. The diameter of the counter bore at this depth was as high as 0.046 inches.

Figure 3D:
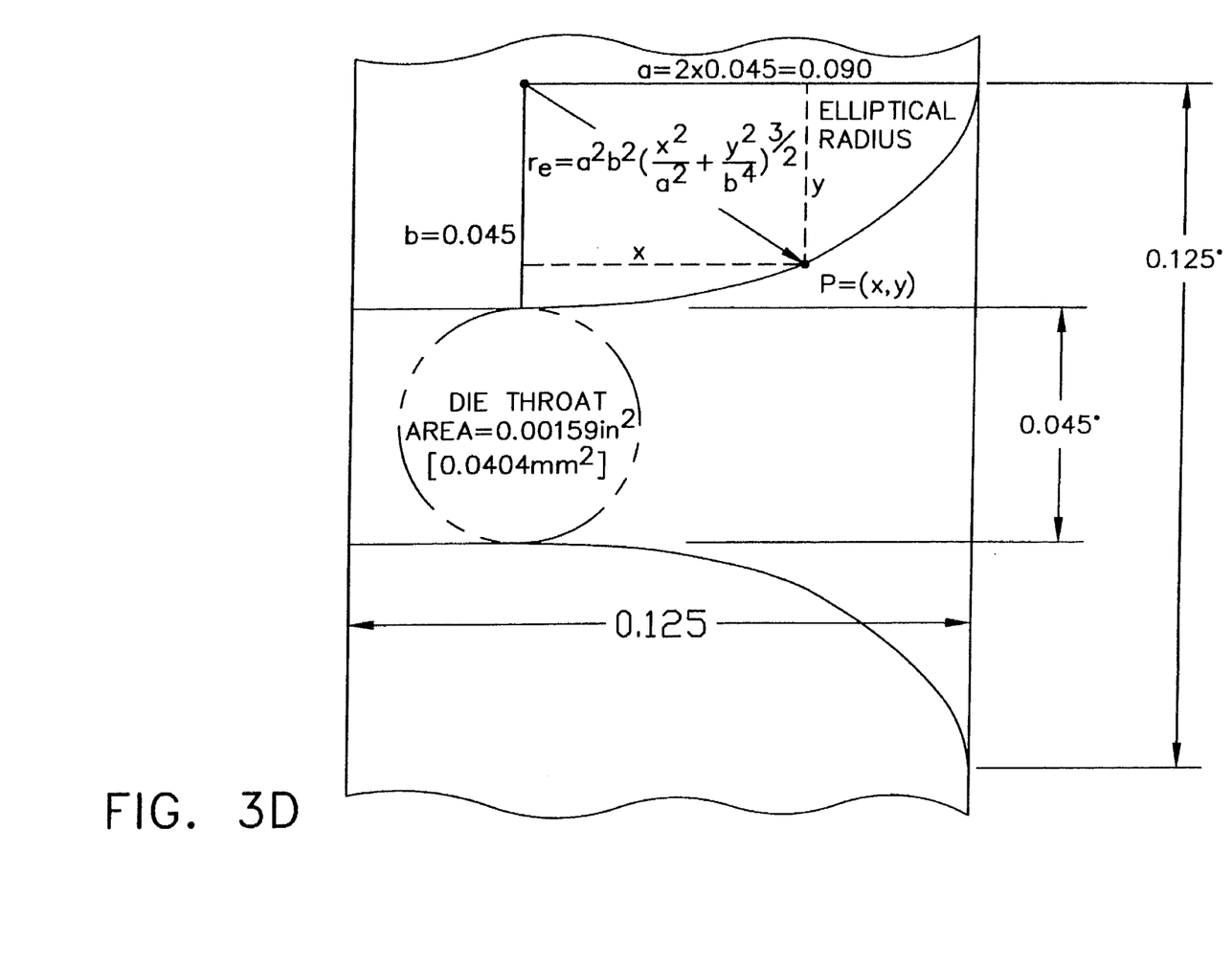

Referring now to FIG. 3C, die opening 82a is shown having elliptical entrance 84a adjacent upstream surface 86a of die plate 88a. This elliptical entrance is configured to promote laminar flow of the $CO_2$ liquified therein and prevent turbulent flow, thereby improving the quality of the $CO_2$ pellet emanating from die opening 82a. By way of example, FIG. 3D illustrates the location of an elliptical entrance and the formula for the radius of curvature for a die opening having a nominal inside diameter of 0.045 inches and a die plate thickness of 0.125 inches. Other smooth transitional shapes may also be used which promote laminar flow.

There are several different physical attributes of die openings 82 which may be considered. The open area ratio of the die plate, which is the total open area of all of the die openings divided by the entire area of the piston face is related to controlling the back pressure at the upstream face of the die plate, based on well known flow equations for fluids. Another physical characteristic is the total wetted perimeter, i.e. the sum of the basic hole circumferences of all die openings in the die plate. This can be used to determine a total wetted perimeter to open area ratio. The higher this ratio, the more pressure required to push the $CO_2$ through the die openings. The total wetted perimeter is related to the amount of friction opposing the flow of the $CO_2$ through the die openings. This resistance to flow, together with the high viscosity of the plasticized $CO_2$ combine to result in the back pressure which exists at the interface between the $CO_2$ cake and the upstream surface of the die plate. Empirically, it has been noted that a total wetted perimeter to total open area ratio of about 50/inch produces high quality, dense pellets. Higher ratios create greater resistance to flow, although ratios as high as 66/inch have resulted in acceptable, good pellets. Too high of a ratio can stall the piston.

By way of example, for die openings having nominal diameters of 0.080 inches, arranged as illustrated in FIG. 3, 912 die openings were used for a total actual open area of 4.584 in². When combined with a 6 inch round piston, which has an area of 28.274 in², the open area ratio is 0.162. For the 912 die openings, the total wetted perimeter is 229.210 inches, producing a wetted perimeter to total open area ratio of 50.002/in.

As another example, for die openings having nominal diameters of 0.060 inches, and arranged as illustrated in FIG. 3A, 3,128 die openings were used for a total actual open area of 8.844 in². The open area ratio was 0.313. The total wetted perimeter was 589.614 inches, resulting in a wetted perimeter to total open area ratio of 66.668/in.

For best results, it has been found that the aspect ratio of the die opening, i.e., the thickness of the die plate to the diameter of the die opening, must be at least 1.0. It has also been found that an aspect ratio of 3.0 can result in stalling the hydraulic system, which exerts forces up to 5,000 psi at the interface between the upstream surface of the die plate and the $CO_2$ cake, and more particularly within the entrance to the die opening.

Figure 6:
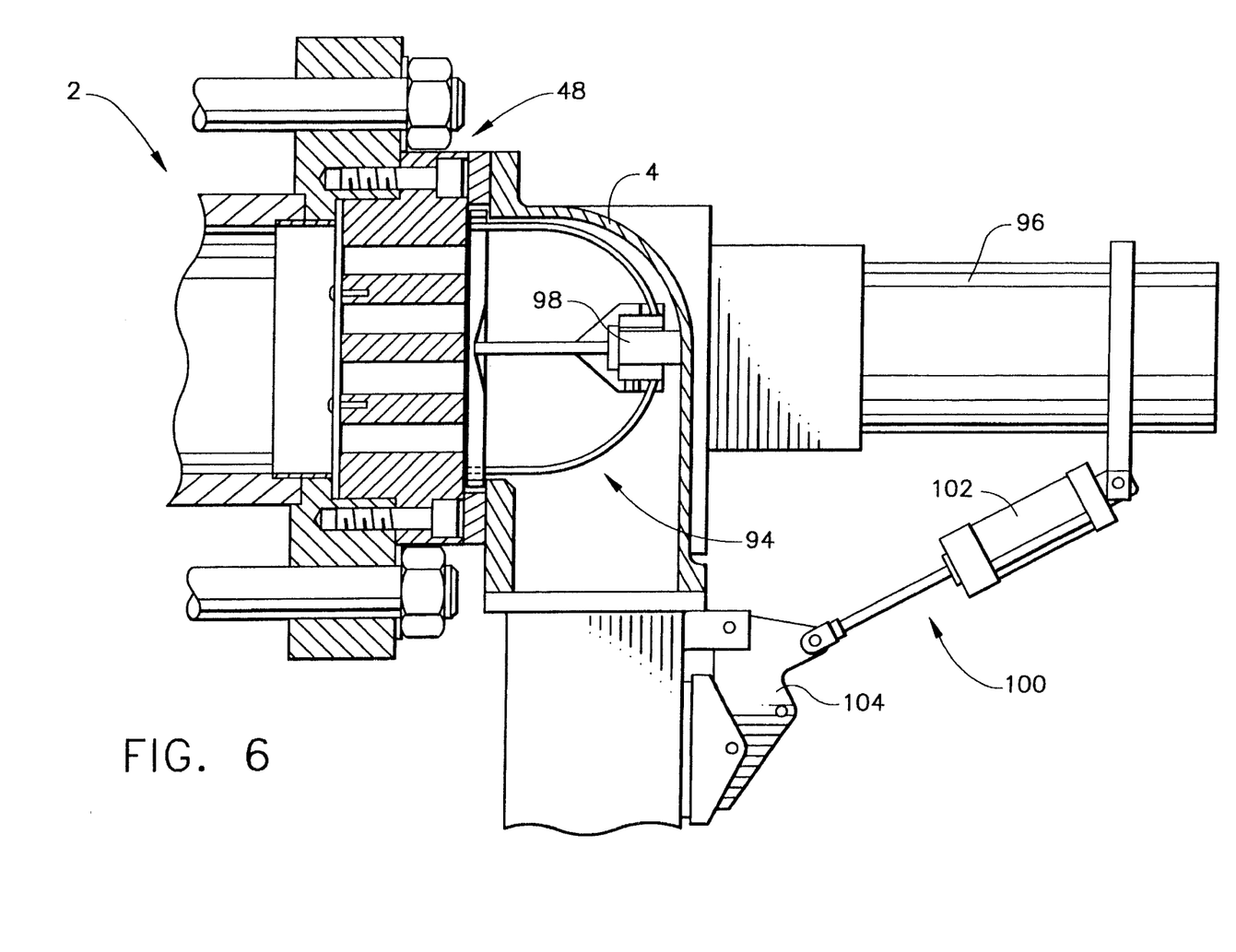
FIG. 6 is an enlarged, fragmentary, partial cross-sectional view of the discharge end of the pelletizer and the cutter assembly.

Referring now to FIG. 6, which is a fragmentary enlarged partial cross-sectional view of exit end 48 having elbow 4 connected thereto so as to receive $CO_2$ pellets discharged by pelletizer assembly 2, there is shown cutter assembly 94 disposed therewithin. Cutter drive motor 96 is carried by elbow 4, and has drive shaft 98 which extends therethrough to engage cutter assembly 94. Upper diverter 100 is shown in FIG. 6, and comprises actuator cylinder 102 supported at one end by motor 96, and connected at the other end to diverter door 104. During the initial chill down cycle of the particle blast cleaning apparatus, diverter door 104 is left open by actuation of cylinder 102 during the first 9 strokes of piston 40. This is because during chill down, good quality pellets are not produced by pelletizer assembly 2, and are diverted outside of the equipment. Diverter door 104 is automatically closed by the control system for the particle blast cleaning apparatus after 9 strokes of piston 40 have occurred. Nine strokes was determined empirically.

Figures 7, 8:
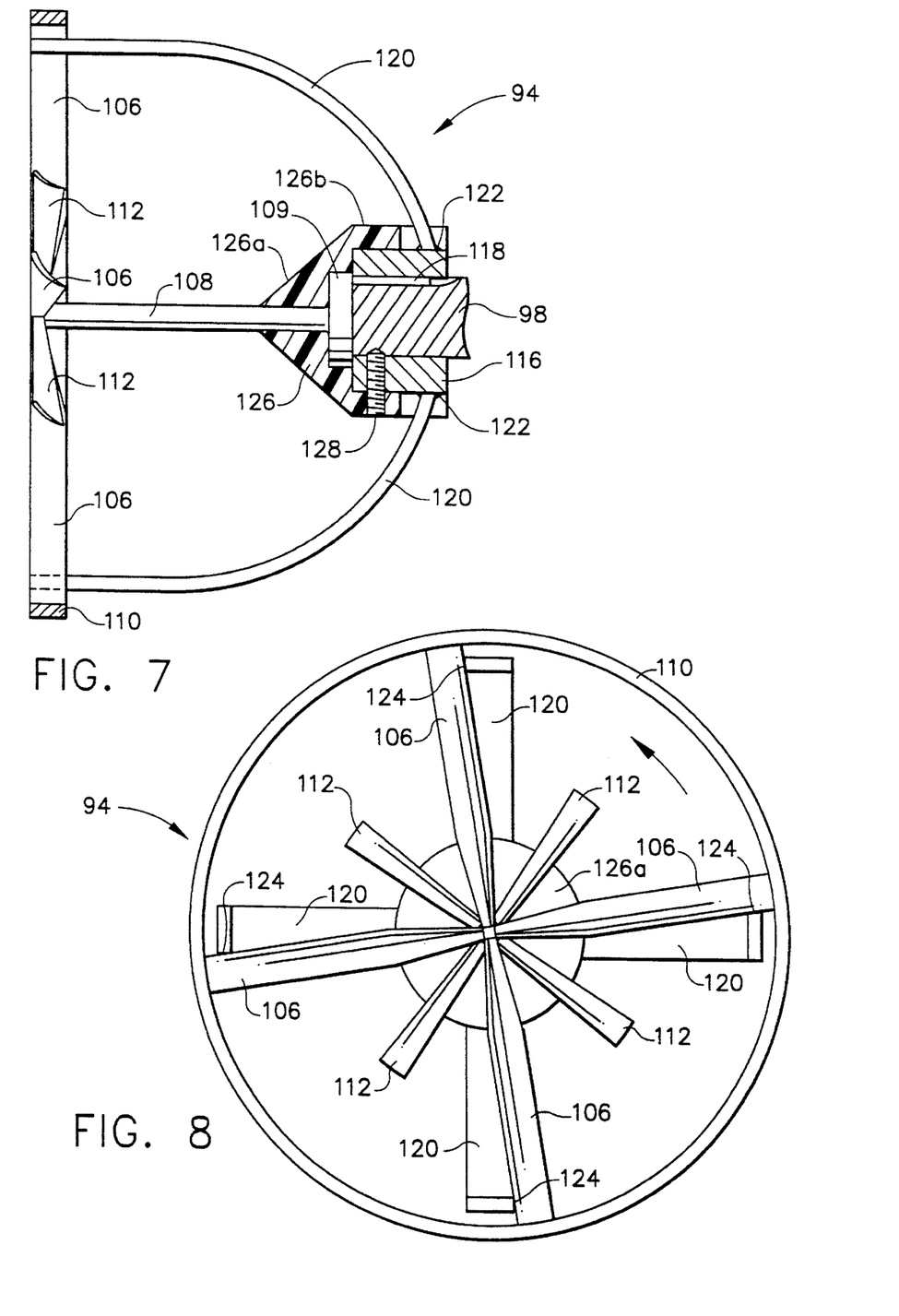
FIG. 7 is a cross-sectional view of the pellet cutter assembly.
FIG. 8 is an end view of the cutter knife assembly.

Referring also to FIGS. 7 and 8, cutter assembly 94 is illustrated having a plurality of cutting blades 106 extending radially outward from shaft 108 to support ring 110. Interposed between cutting blades 106 and extending radially outward from shaft 108 are additional cutting blades 112. The distal ends of cutting blades 112 may alternatively be supported by a cross member (not shown) extending between respective pairs of blades 106. Such a cross member may also act as a cutting blade. The inner ends of blades 106 and 112 are welded together, and shaft 108 is welded thereto.

Cutting blades 106 and 112 are disposed adjacent downstream surface 114 of die backing block 52. By rotation of cutter assembly 94, the continuous individual pieces of solid $CO_2$ discharging from each individual die opening 64 is cut by blades 106 and 112 into substantially uniform lengths.

Cutter assembly 94 includes stainless steel hub 116 which receives drive shaft 98. Hub 116 is keyed to drive shaft 94 by key 118 which transmits the torque from drive shaft 98 to cutter assembly 94. A plurality of arched drive members 120 are welded to hub 116 at locations 122. The respective distal ends of drive members 120 are welded to respective cutting blades at locations 124. Disposed about hub 116 and a portion of shaft 108 is insulating member 126 which includes a frustoconically shaped portion 126a which blends into a conical portion 126b which extends about stainless steel hub 116. Set screw 128 extends through insulating member 126, hub 116 and into a hole drilled in drive shaft 98 so as to locate cutter assembly 94 axially on drive shaft 98. The distal end of shaft 108, which includes hub 109 is supported by member 126, and is inserted through member 126 as shown before shaft 108 is welded to blades 106 and 112 at its the proximal end.

Insulating member 126 is machined from UHMW plastic and functions as a thermal barrier to reduce the transfer of heat from motor 96 to cutter assembly 94.

Frustoconically shaped portion 126 is so shaped to promote the smooth flow of pellets being discharged by pelletizer 2. By way of example, it is noted that during the full stroke of piston 40 (½ inch to ¼ inch per second), for 0.080 inch diameter die openings, each strand of solid $CO_2$ can advance about 25" having a speed of 7–9 inches per second. Typically, on the average, 6.5 pounds of pellets are produced by each stroke of piston 40.

The rotational speed of cutter assembly 94 is selected so as to provide the desired length of $CO_2$ pellets. The range of speed utilized thus far has been between 50 RPM–500 RPM. This speed may be adjusted during operating of the equipment so that the length of the $CO_2$ pellet can be controlled in process. Alternatively, rather than being separately and manually adjustable, the speed could be set as part of the process control for all of the equipment.

Figure 9:
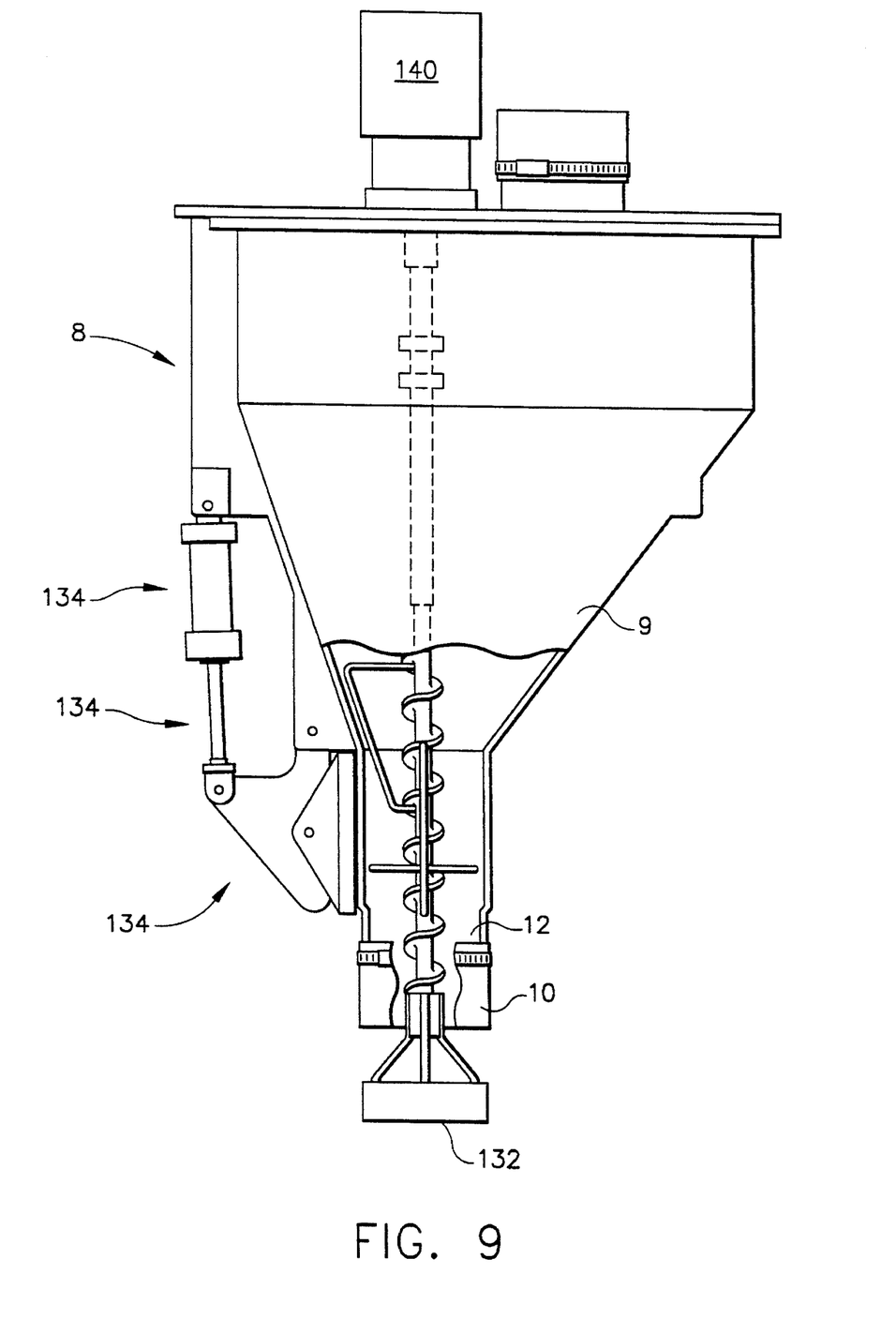
FIG. 9 is an enlarged view of the hopper assembly, partially cut away to show the auger assembly within the hopper.

Referring now to FIG. 9, hopper assembly 8 is illustrated, with hopper 9 partially cut away to show rotating auger assembly 130. The CO₂ pellets flow through transition assembly 6 into hopper 9. As disclosed in U.S. Pat. No. 4,947,592, in order to avoid agglomeration of CO₂ pellets in hopper 9 and to advance pellets into receiving station 14 of feeder 16, auger assembly 130 extends through the interior cavity of hopper 9, through exit 12 such that end 132 of auger assembly 130 is located, almost in line to line contact with the rotor (not shown) of feeder 6 at receiving station 14. Hopper assembly 8 includes lower diverter assembly 134 which may be opened to dump CO₂ pellets out of the hopper to the environment. Such discharge is utilized to empty hopper 9 when the equipment will not be used for a period of time so as to avoid agglomeration of the pellets. Such discharge may occur as part of the process control for the equipment to occur automatically upon a predetermined time lapse of non operation, for example after 15 minutes of non use.

Figure 10:
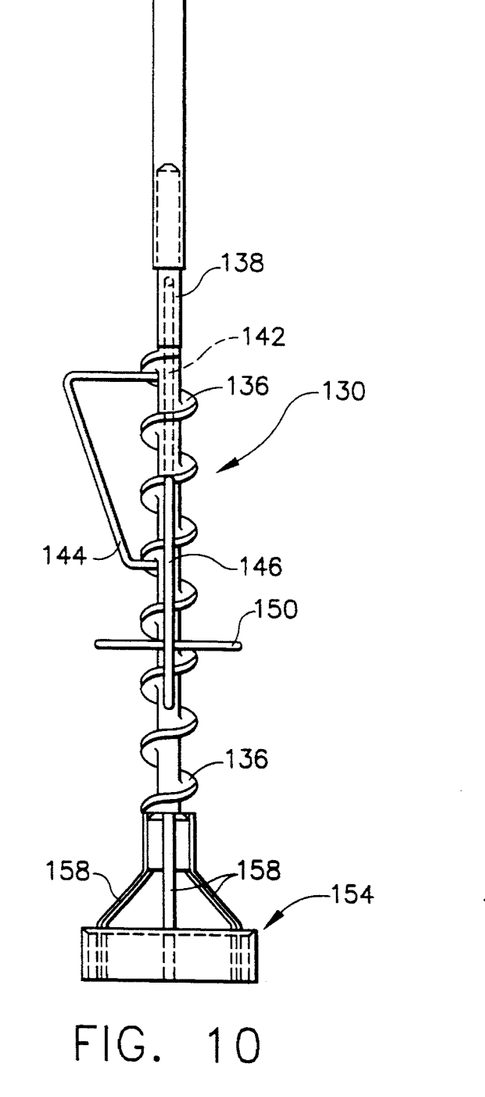
FIGS. 10, 11 and 12 are front, side and end views, respectively, of the auger assembly.
Figure 11:
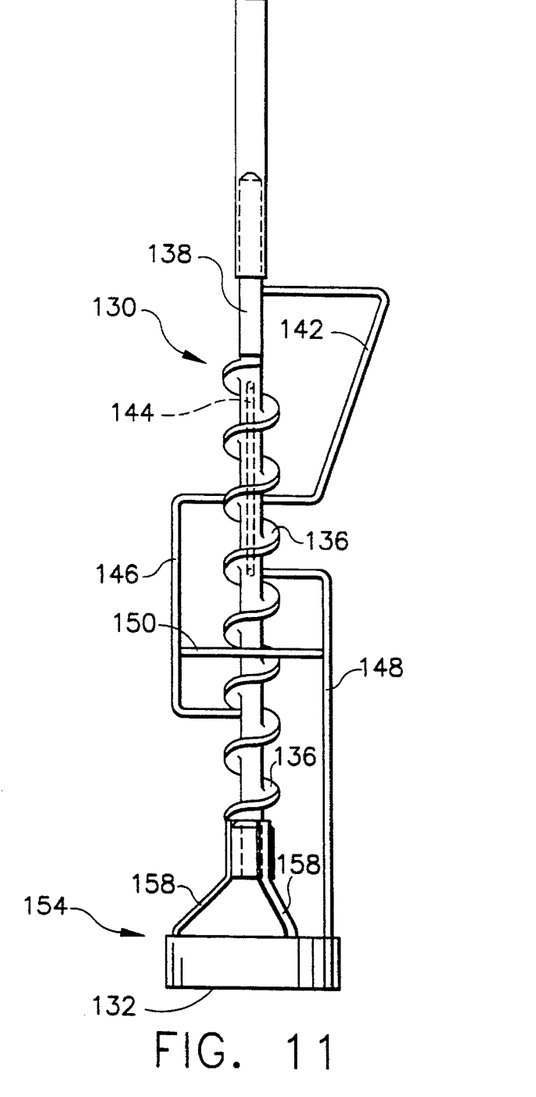
Figure 12:
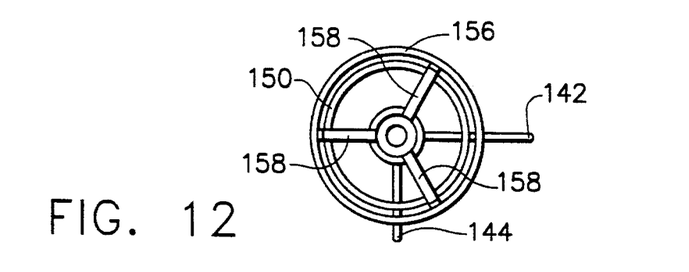

Referring also to FIGS. 10, 11 and 12, auger assembly 130 includes a continuous inclined surface 136 extending from auger shaft 138. Auger shaft 138 is rotated by any suitable means, such as motor 140 mounted atop hopper assembly 8. A plurality of agitation rods 142, 144, 146 and 148 extend from shaft 138. Agitation rods 142 and 144 are shaped generally complimentary to the section of hopper 9 adjacent which they are disposed, being generally inclined inwardly and downwardly. It is noted that there is approximately ⅛th inch clearance between agitation rods 142, 144, 146 and 148 and hopper 9. If agitation rods 142, 144, 146 and 148 are too close to the internal sides of hopper 9, the CO₂ pellets could be ground by the agitation rods causing them to pack tightly and agglomerate. Agitation rods 146 and 148 are also shaped complimentary to the corresponding section of hopper 9 and tube 10 adjacent which they are located, being generally vertical. Circular support 150 extends between agitation rods 146 and 148.

Connected to distal end 152 of auger shaft 138 is ring assembly 154, including annular ring 156 which defines end 132 of auger assembly 130 and is supported by auger shaft 138 by support members 158. This configuration allows pellets to flow through the interior of annular ring 156 and directly into receiving station 14 of feeder 16.

The rotor (not shown) of feeder 16 may be a single cavity rotor, a dual cavity rotor, or even a dual rotor as set forth in U.S. Pat. No. 4,947,592.

The foregoing description of a preferred embodiment of the invention has been presented for purposes of illustration and description. It is not intended to be exhaustive or to limit the invention to the precise form disclosed. Obvious modifications or variations are possible in light of the above teachings. The embodiment was chosen and described in order to best illustrate the principles of the invention and its practical application to thereby enable one of ordinary skill in the art to best utilize the invention in various embodiments and with various modifications as are suited to the particular use contemplated. It is intended that the scope of the invention be defined by the claims appended hereto.

We claim:

1. A method for producing carbon dioxide pellets, comprising the steps of:
    (a) providing a die plate having a plurality of respective die openings formed therethrough, said die plate having upstream and downstream surfaces, each said respective die opening having an entrance adjacent said upstream surface;
    (b) providing carbon dioxide in the solid phase adjacent said die plate upstream surface;
    (c) urging said carbon dioxide in the solid phase toward said die plate with force sufficient to cause said carbon dioxide to flow into said respective entrances substantially as a super viscous liquid; and
    (d) flowing said carbon dioxide through said respective die openings at a rate such that said carbon dioxide under goes a phase change from a super viscous liquid to the solid phase within said respective die openings.

2. The method of claim 1 wherein said super viscous liquid is under a pressure of about 5000 psi.

3. The method of claim 1 wherein said respective die openings have a total wetted perimeter to total open area ratio of at least about 50 per inch.

4. The method of claim 1 wherein the aspect ratio of said die openings is at least about 1.

5. The method of claim 1 wherein the aspect ratio of said die openings is no greater than about 3.

6. A method for producing carbon dioxide pellets, comprising the steps of:
    (a) providing a die plate having a plurality of respective die openings formed therethrough, said die plate having upstream and downstream surfaces, each said respective die opening having a respective entrance adjacent said upstream surface;
    (b) providing carbon dioxide in the solid phase adjacent said die plate upstream surface;
    (c) urging said carbon dioxide in the solid phase toward said die plate with force sufficient to cause said carbon dioxide to under go a first phase change from the solid phase to the liquid phase and flow within said respective entrances, thereby forcing said carbon dioxide to flow through said respective die openings such that substantially all of said carbon dioxide flowing within a portion of said respective die openings is in the liquid phase; and
    (d) flowing said carbon dioxide at a rate such that the flow of said carbon dioxide into said respective entrances and within said portion of said respective die openings is substantially laminar.

7. The method of claim 6 wherein the Reynolds number of said flow of said carbon dioxide into said respective entrances and within said portion of said respective die openings is no greater than about 2000.

8. The method of claim 6 wherein the flow of said carbon dioxide within said respective entrances and within said die openings is substantially devoid of mechanical sheer.

9. The method of claim 6 wherein said respective entrances are elliptical.

10. The method of claim 6 wherein said die opening have a roughness in the range of about 64 to 125 micro inches.

11. A method for producing carbon dioxide pellets, comprising the steps of:
    (a) providing a die plate having a plurality of respective die openings formed therethrough, said die plate having upstream and downstream surfaces, each said respective die opening having a respective entrances adjacent said upstream surface, said respective die openings having a total wetted perimeter to total open area ratio of at least about 50 per inch;
    (b) providing carbon dioxide in the solid phase adjacent said die plate upstream surface; and
    (c) urging said carbon dioxide in the solid phase toward said die plate with force sufficient to cause said carbon dioxide to under go a first phase change from the solid phase to the liquid phase and flow within said entrance, thereby forcing said carbon dioxide to flow through said respective die openings such that substantially all of said carbon dioxide flowing within a portion of said respective die openings is in the liquid phase.

12. The method of claim 11 comprising the step of flowing said carbon dioxide through said respective die openings at a rate such that said carbon dioxide under goes a second phase change from the liquid phase to the solid phase within said respective die openings.

13. The method of claim 11 wherein the Reynolds number of said flow of said carbon dioxide into said respective entrances and within said portion of said respective die openings is no greater than about 2000.

14. The method of claim 11 wherein the flow of said carbon dioxide within said respective entrances and within said die openings is substantially devoid of mechanical shear.

15. The method of claim 11 wherein said respective entrances are elliptical.

16. The method of claim 11 wherein said die opening have a roughness in the range of about 64 to 125 micro inches.

* * * * *